US005637178A

United States Patent [19]

Suenens et al.

[11] Patent Number: 5,637,178

[45] Date of Patent: Jun. 10, 1997

[54] METHOD AND APPARATUS FOR ASSEMBLING INNERSPRING CONSTRUCTIONS FOR MATTRESSES CUSHIONS AND THE LIKE

[75] Inventors: Albert J. Suenens; Marcel Ghysels, both of St.-P.-Leeuw, Belgium

[73] Assignee: NV B'Linea, Beersee-Lot, Belgium

[21] Appl. No.: 864,318

[22] Filed: Apr. 6, 1992

Related U.S. Application Data

[62] Division of Ser. No. 484,849, Feb. 26, 1990, Pat. No. 5,126,004.

[30] Foreign Application Priority Data

Oct. 5, 1989 [BE] Belgium ............................ 08901068

[51] Int. Cl.$^6$ ............................ B32B 31/00

[52] U.S. Cl. ............................ 156/297; 156/301; 156/563

[58] Field of Search ............................ 156/297, 300, 156/301, 302, 556, 558, 559, 563, 566

[56] References Cited

U.S. PATENT DOCUMENTS

| | | | |
|---|---|---|---|
| 3,325,833 | 6/1967 | Withoff | 5/478 |
| 3,367,823 | 2/1968 | Clausen et al. | 156/559 |
| 3,429,767 | 2/1969 | Bronstien, Jr. et al. | 5/478 X |
| 3,704,883 | 12/1972 | Don | 156/556 |
| 3,909,342 | 9/1975 | Shock | 156/522 |
| 3,930,929 | 1/1976 | Lingl | 156/558 |
| 4,401,501 | 8/1983 | Stumpf | 156/367 |
| 4,566,926 | 1/1986 | Stumpf | 156/165 |
| 4,578,834 | 4/1986 | Stumpf | 156/291 |
| 4,931,131 | 6/1990 | Thompson | 156/556 |

FOREIGN PATENT DOCUMENTS 2470088 5/1981 France .

*Primary Examiner*—James Engel

*Attorney, Agent, or Firm*—Cushman, Darby & Cushman IP Group of Pillsbury Madison & Sutro LLP

[57] ABSTRACT

A method and apparatus for manufacturing innerspring constructions for mattresses, cushions and the like, consisting of strings of jackets encasing each one coil spring, which are fixed side to side by means of an adhesive; the apparatus consisting of at least:

a moving means or conveyor for moving a string of a particular size according to its longitudinal direction;

a fixed applicator mounted in front of the conveyor, for depositing adhesive to a string moving along on said conveyor and means for positioning the coated side of said string to a similar string and pushing it into contact.

6 Claims, 5 Drawing Sheets

METHOD AND APPARATUS FOR ASSEMBLING INNERSPRING CONSTRUCTIONS FOR MATTRESSES CUSHIONS AND THE LIKE

This is a division of application Ser. No. 07/484,849, filed Feb. 26, 1990, now U.S. Pat. No. 5,126,004.

The invention is relating to a method for assembling innerspring constructions for mattresses, cushions and the like, comprising series of pocketed coil springs stuck together side by side, the springs being arranged separately and substantially parallel to one another with respect to their longitudinal axis, but transversely on the longitudinal axis of the series.

Such a method has been described in the European Patent Applications Nos. 0 154 076 and 0 155 158.

The methods described therein have several disadvantages: it is impossible or at least very difficult to apply them continuously and, moreover, only one spring pattern is possible in innerspring constructions assembled by means of these methods.

The main aim of the present invention is to remedy these disadvantages and to propose a method which can be applied substantially continuously because of the concept's simplicity. Hence the method is less labor intensive and output can be increased considerably. Moreover, quality is improved as the influence of the human factor is decreased to a minimum.

To this purpose a first string of a certain number of pocketed springs is moved according to its longitudinal axis.; at least one side of the string which extends about parallel to the axis of the springs is coated with an adhesive by a fixed applicator; the coated side is positioned against the corresponding side of a similar string of pocketed springs after which it is pushed into contact with said second string; the cycle of operations of moving, adhering and pressing together successive strings of pocketed springs is repeated until an innerspring construction of desired size is obtained.

In a more specific embodiment of this method the exterior surface of the first string of pocketed springs, to be coated with adhesive, is brought into a substantially horizontal position facing up when the adhesive is set; then, the string and its coated side is turned to substantially vertical position and pushed into contact with another similar surface of a second string of pocketed springs which has no adhesive coating; the cycle of operations is repeated until an innerspring construction of desired size is obtained.

The invention is also relating to the apparatus necessary for the application of said method.

The apparatus is characterized in that it includes at least following parts:

- a conveyor or moving means for moving a string of desired length longitudinally;
- an applicator fixed facing the conveyor and used for applying adhesive on the string moving together with said conveyor;
- positioning and pressure means for positioning the coated side of a string against the corresponding side of another string and applying pressure thereto.

Advantageously, said positioning and pressure means for positioning and pressing the with adhesive coated strings of pocketed springs against similar strings mainly consists of, on the one hand, an elongated topple table which can be tilted from a vertical to a horizontal position around a rotation axis which is substantially parallel to the conveyor's longitudinal direction, the axis being situated at the longitudinal side of the topple table opposed to the conveyor, and onto which a string of pocketed springs can be slid from the conveyor if the table is in horizontal position; and, on the other hand, an assembly platform for assembling strings, which is situated next to the topple table, at the side of the rotation axis, such that when the latter is put in vertical position a string of pocketed springs is positioned against a similar string on the assembly platform after which the topple table translates in vertical position toward the assembly platform applying pressure to the string of pocketed springs coming from the topple table and thus adhering it to a similar string lying on the assembly table already.

Other particularities and advantages will result from the following description of a specific embodiment of the method and apparatus according to the invention; the description is merely meant as an illustration and therefor it does not limit the scope of the protection being claimed here; numbers used hereafter refer to the accompanying drawings.

FIG. 1 is a schematic top plan view of an apparatus for manufacturing constructions according to the invention.

FIG. 2 provides part of a section along line II—II of FIG. 1, but on a larger scale. It relates to a cutting device in position of rest.

FIG. 3 provides a similar section as in FIG. 2, but now the cutting device is ready for use.

Figure 1:
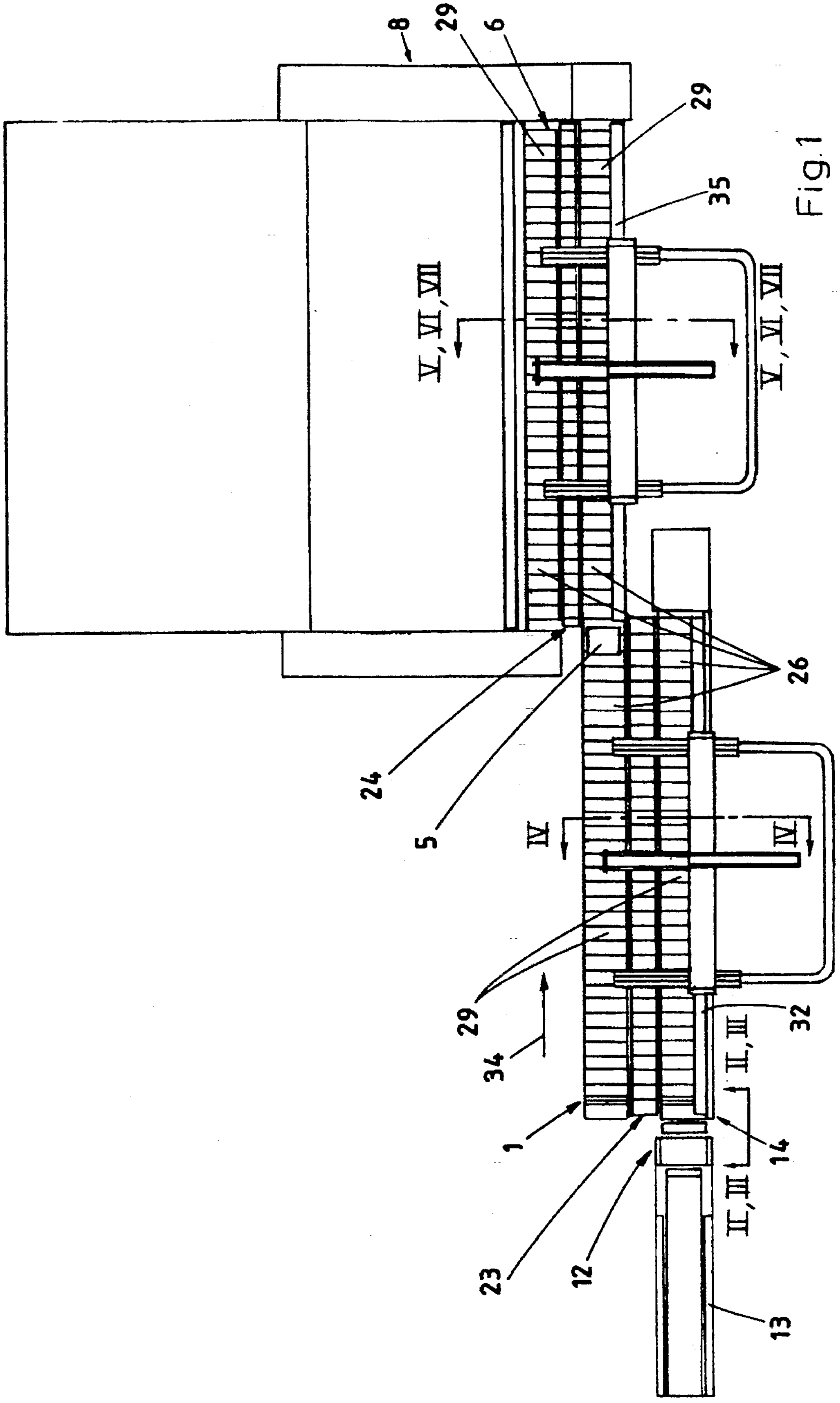
Figure 6:
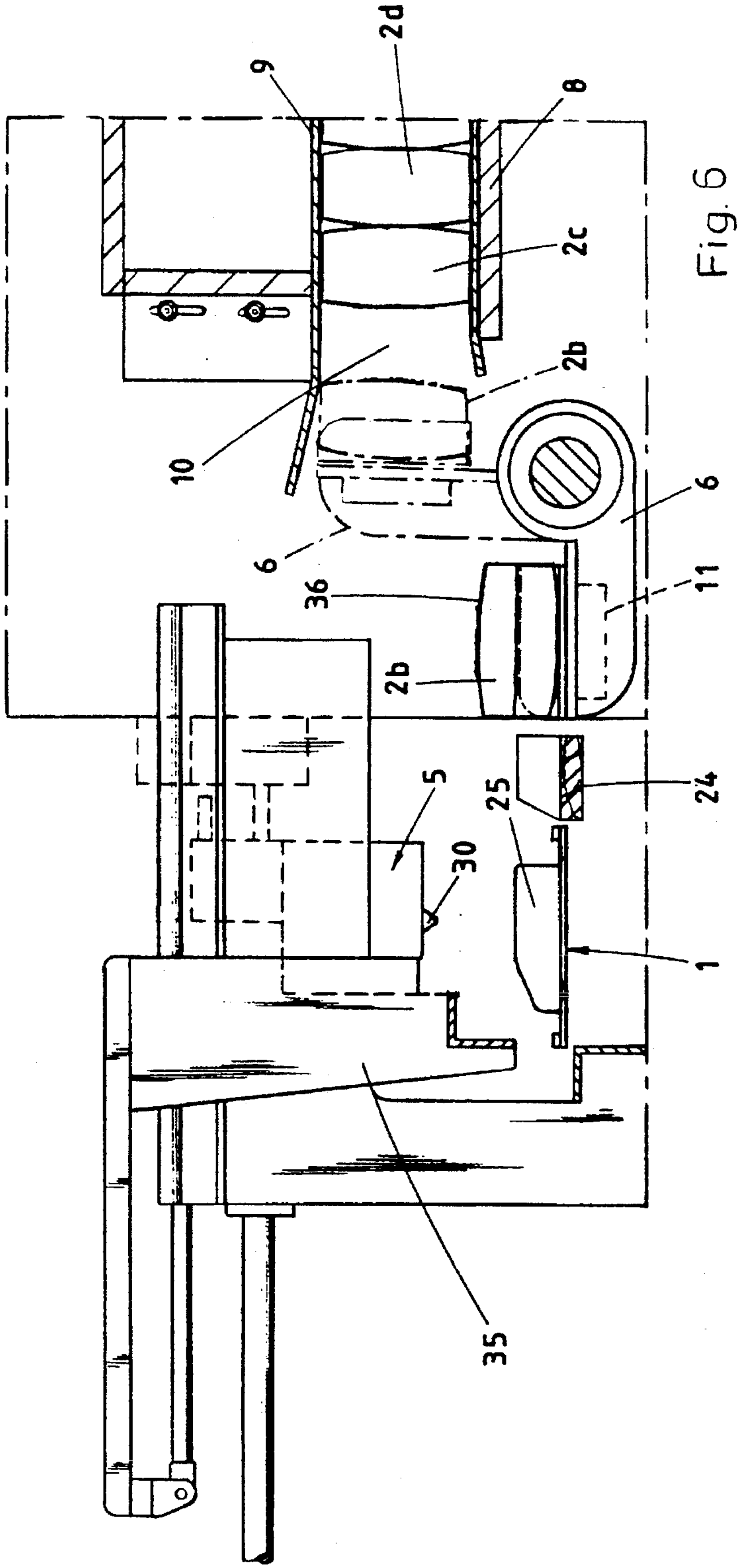

FIG. 6 provides a similar section along line VI—VI of FIG. 1. It relates to the transport of a coated string of pocketed springs to the assembly platform.

Figure 7:
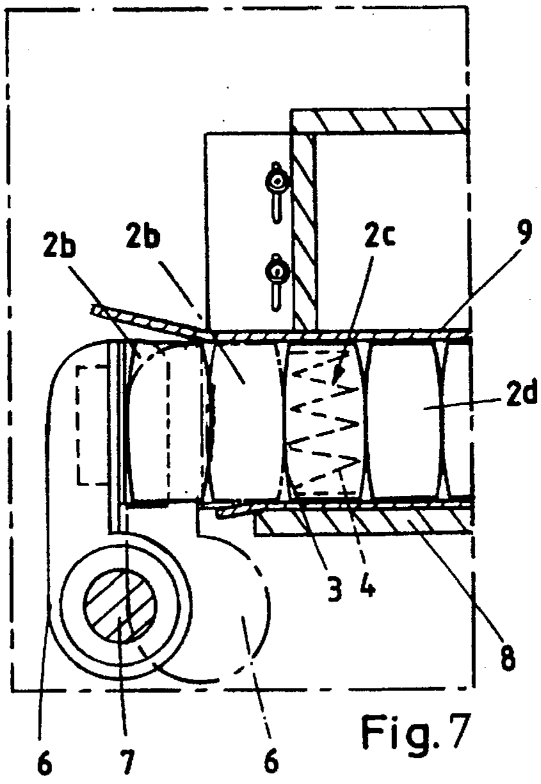

FIG. 7 is a partially sectional side elevation view according to line VII—VII of FIG. 1. It shows how a newly arrived string of pocketed springs, coated with adhesive, is pushed into contact with the strings which have already been treated.

Figure 8:
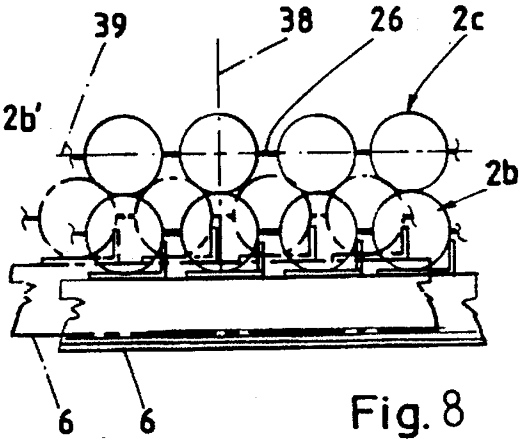

FIG. 8 provides a top plan view of the obtained innerspring construction.

In the different figures the same reference numbers are relating to the same elements.

According to the invention, the starting point of the method for construing an innerspring construction for mattresses, cushions, and the like are in jackets encased coil springs forming a string wherein the springs have their axis parallel to each other and perpendicular to the longitudinal direction of the string. Similar strings of pocketed springs have been described in European Patent Applications 154 076 and 155 158. The pockets or jackets are made out of an oblong strip of cover which preferably consists of an oblong piece of weldable fabric, which has been folded in the middle according to its longitudinal axis and which has been welded near the folded edges of the longitudinal side. By means of transverse welds at regular intervals a series of successive close-fitting jackets is obtained which each contain one spring.

In certain cases cover fabric may be used which is not weldable, such as cotton. In the latter case jackets can be obtained by use of stitches or some bonding material. It might even be possible to combine several existing techniques, depending on the cover fabric and the available apparatus.

However, the matter will be left aside, as these strings of pocketed springs and the method for manufacturing them are not really the object of the invention.

According to the invention the method mainly consists of using such strings of pocketed springs to make an innerspring construction by means of a combination of several operations which may be known already per se, hence adhering several such strings to one another, as described f.i. in the European Patent Application 154 076.

According to the invention, a string of pocketed springs of chosen length is moved longitudinally; at a certain, fixed spot an adhesive coating is set on at least one of the exterior sides of the cover, which extends substantially parallel to the axis of the springs; finally the coated side is positioned against and pushed into contact with the corresponding side of a similar string of pocketed springs. The cycle of operations is repeated on successive similar strings until an innerspring construction of desired size is obtained.

More particularly, the side of the string of pocketed springs which would be coated, is brought into a horizontal position, facing upward, when the adhesive is set, such that the adhesive is dispersed from above. On this way, the adhesive penetrates the cover fabric well, while running of the adhesive is largely avoided. This might be important if relatively liquid glue is used to cover large parts of a side of a string of pocketed springs.

When the adhesive is set, the springs are put upright; the coated cover side is then pushed into contact with a similar cover side of a second string of pocketed springs, which was not coated with adhesive; usually the other side of the latter string was treated like the former with adhesive in an earlier stage, though.

Naturally the cycle of different operations of moving, adhering and pressing together is repeated on successive strings until an innerspring construction of desired size is obtained.

In order to follow for a continuous application of the method, a continuous string of indefinite length of pocketed springs is used, and each time the desired length is cut off, the part which will be cut off being arranged in such a position that the cover side onto which the adhesive coating will be set, is turned immediately in a substantially horizontal facing up position. This string part, which has been cut off, is moved according to horizontal direction perpendicularly to its longitudinal direction until in front of the place or spot where adhesive coating is set.

Next, said string part is positioned according to its longitudinal axis or direction in front of said spot, while at the same time the top side is coated with adhesive.

The coated string part is then again moved in horizontal fashion but transversely as to its longitudinal direction, after which it is tilted upright and pressed side to side to a similar string part which has its springs put upright as well.

While the adhesive coating is being set, another part of the continuous string is cut off, which then in turn is submitted to the cycle. The cycle of operations is repeated several times until a sufficient number of string parts adhered side to side is obtained.

The string parts can be stuck together in such a way that the axis of springs encased in one and the same string lie in the same plane, while the axis of adjacent strings lie on planes which are set perpendicularly on said plane, thus arranging the springs of the innerspring construction in a square.

However, according to the invention, it is possible to put the pocketed springs of a particular string in a quincunx pattern with respect to the pocketed springs of another string, before the coated string part is pushed into contact with another string part; the quincunx pattern is obtained by pushing the string part alternately according to the opposite direction of its longitudinal axis, such that the spring axis of a particular string part are positioned against the transverse welds or divisions between two successive jackets of a second string part. On this way, every spring jacket of a string part is adjacent to two adjoining jackets of adjoining string parts, except for spring jackets at the outermost sides of the string part. Hence an innerspring construction is obtained in which the spring axis are arranged in a quincunx pattern—i.e. in a centred square.

Thus, on a same surface the number of springs increases and, if necessary, mutual linking between jackets can be made stronger.

Preferably, when applying the invention, the adhesive is sprayed onto the relating side of the string of pocketed springs.

According to the invention, this is most easily done when the gas required for the dispersion of the adhesive is blown continuously under a certain amount of pressure along the side which will be coated with adhesive and to add at chosen intervals the necessary amount of adhesive to be sprayed onto a jacket to the flux of gas, such that e.g. every two or three jackets of a string side is coated with that particular amount of adhesive.

On this way a relatively homogeneous coating of adhesive is obtained, which covers a great part of the side wall of a particular spring jacket.

Hence, when, as was described above, a coated string of pocketed springs is pushed into contact with a similar string, the entire contact surface between the jackets will be adhered.

It is important that the adhesive has lasting resilient and flexible qualities, otherwise the axial deformation of the springs might be obstructed when using a mattress including an innerspring construction with springs like the above.

An entire automatised apparatus working according to the principles of the invention is illustrated in FIGS. 1 to 8.

The apparatus includes at least following parts:

1. a conveyor 1 for moving a string 2 of chosen length according to its longitudinal axis, the string consisting of jackets 3 encasing coil springs 4;
2. a fixed applicator 5 mounted in front of the conveyor 1 for coating strings 2 moving along said conveyor 1 with an adhesive, and
3. means for positioning and pressing the coated string side against another similar string side.

These means are formed, on the one handy by an elongated topple table 6 parallel to the conveyor 1 which can be tilted from a horizontal to a vertical position around a rotation axis 7 parallel to the longitudinal axis of the conveyor 1 and, on the other hand, by an assembly platform 8.

The rotation axis 7 is situated at the longitudinal side of the topple table 6 away from the conveyor 1, and next to the assembly platform 8, such that if the topple table 6 is put in a vertical position a string of jackets 3 encasing springs, going over the table will be positioned against a similar string on the assembly platform 8.

The topple table 6 is thus so situated that a string of jackets encasing springs which is on the conveyor 1 can be slid onto the topple table 6 if the latter is in a horizontal position.

Other means are provided to allow for the topple table 6 to translate toward the assembly platform 8 when in vertical position, to push a string 2 of jackets 3 encasing springs, lying on the table into contact with a similar string which was placed on the assembly platform earlier on. This is illustrated in FIG. 7. To this aim it suffices that the axis 7 is erected on a sledge (not shown in the drawings) which can move back and forth in a horizontal plane, according to a direction perpendicular to the rotation axis 7.

Right above and parallel to the assembly platform 8 a pressure plate 9 is mounted which is adjustable in height; hence, some room 10 is left between the assembly platform 8 and the pressure plate 9. The height of the pressure plate with respect to the platform is set so that it will slightly compress each row of springs and thereby hold them in position. On this way a coated string of pocketed springs coming from the topple table 6 onto the assembly platform 8 is pushed with adjustable pressure against the strings stuck between the assembly platform, and the pressure plate 9, while, at the same time, the adhered strings are moved over a distance corresponding to one coil spring diameter.

Underneath the surface of the topple table 6 several electro-magnets 11 are mounted which can be switched on and off, so that, when the topple table is tilted into a vertical position, the pocketed springs lying on the table remain in place.

Apart from rotating around the axis 7, the topple table 6 can move back and forth axially according to said axis in comparison to a position of rest, over a distance corresponding to the largest possible diameter of the pocketed springs.

Figure 2:
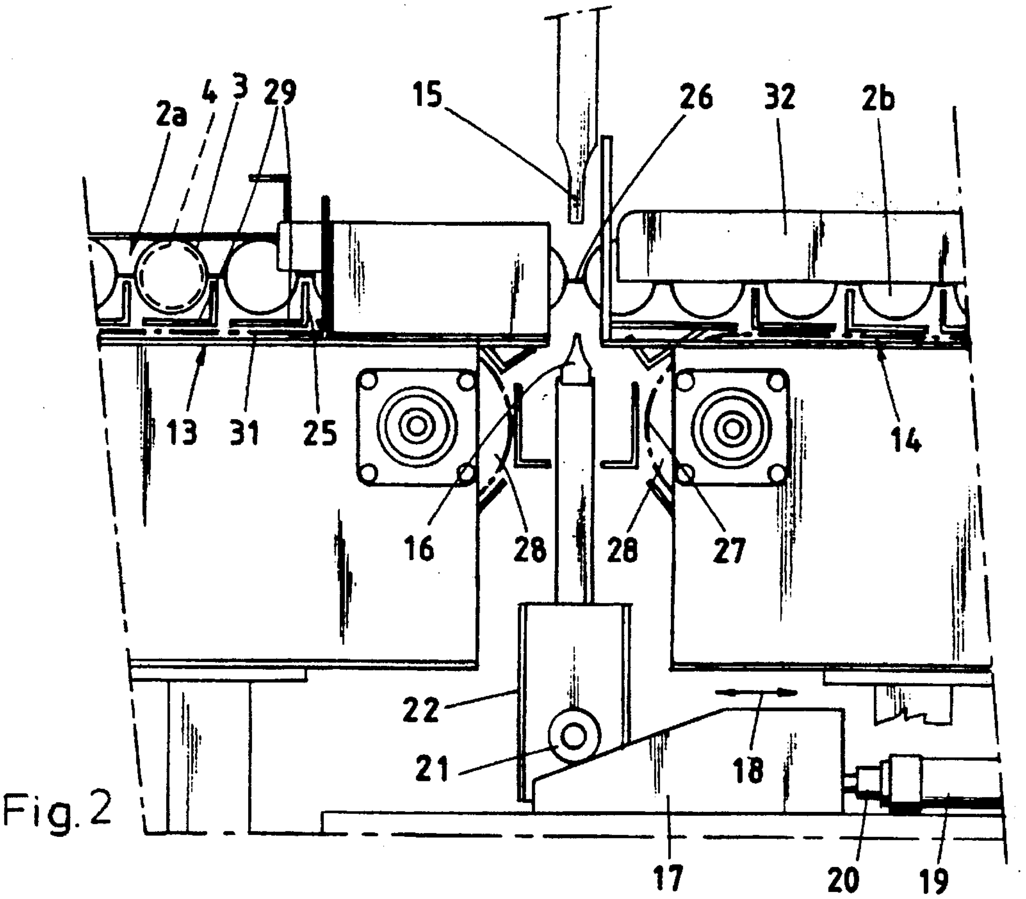
Figure 3:
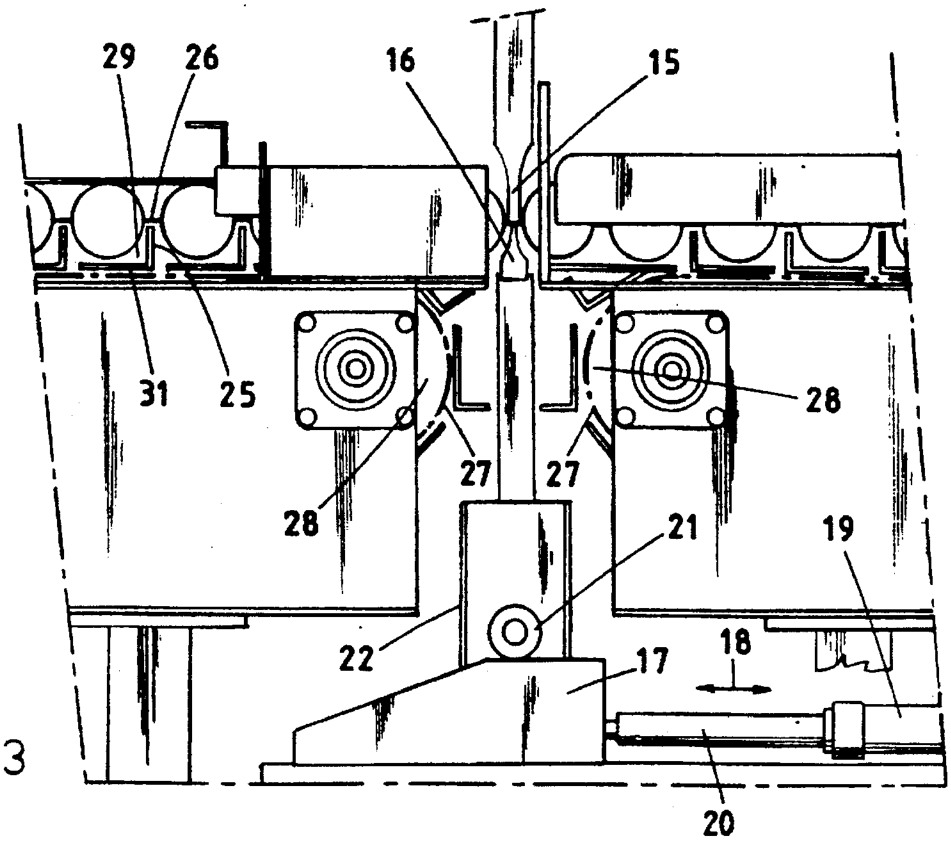
Figure 4:
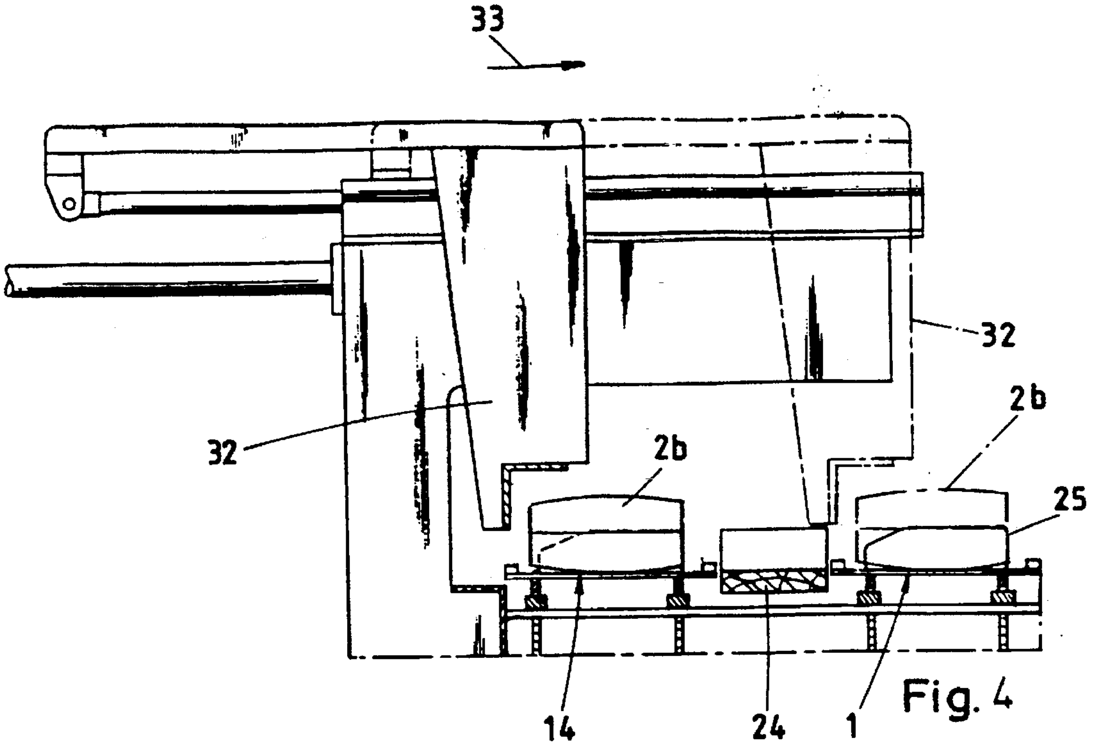
FIG. 4 is a partially sectional side elevation view along line IV—IV of FIG. 1, also on a larger scale.

At the entrance of the apparatus for manufacturing innerspring constructions, as represented in the accompanying drawings, a cutting device 12 is mounted, as illustrated in FIG. 1 and on a larger scale and in more detail in FIGS. 2 and 3.

The cutting device 12 is supposed to cut strings of a chosen size off a string of pocketed springs of indefinite length. Said cutting device is mounted between two successive conveyors 13 and 14, which move along parallel to the above-mentioned conveyor 1.

The cutting device 12 consists of two cutting elements 15 and 16 working together and moving up and down between a position of rest, as seen in FIG. 2, in which the cutting elements are set apart, and a working position, as seen in FIG. 3, in which the cutting elements are pressed against each other. The movement up and down of the lower device is brought about by a cam 17 which can move back and forth in a horizontal direction, as is indicated by arrow 18, and is driven by a piston 20 moving back and forth in a cylinder.

The top of the cam 17 cooperates with a guiding wheel 21 which is mounted sidewise on a sledge 22 moving up and down, onto which the lower cutting element 16 is fixed.

The drive of the upper cutting element 15 is not represented, but can be similar to the one of the lower cutting element. It should be obvious that other, equivalent driving means, may be used for causing the movement up and down of the cutting elements 15 and 16.

On this way a cut between two successive jackets of said string of indefinite length is made with the springs lying in a horizontal position.

A fixed guiding support 23 is provided between the conveyor 14 mounted after the cutting device 12 and the conveyor 1 on which the jackets encasing springs are coated, passing on strings of pocketed springs from the first conveyor to the second.

A similar fixed guiding support 23, is mounted between the conveyor 1, taking care of bringing adhesive strings, and the topple table 6, for sliding strings of pocketed springs from the conveyor 1 to the topple table 6.

Said different conveyors 1, 13 and 14, have upright standing catch means 25 which are arranged transversely on the longitudinal direction of the conveyor at a distance corresponding to the distance between two demarcation lines 26 of different jackets.

In this particular embodiment of the apparatus according to the invention, each conveyor comprises two parallel running endless chains 27, as represented schematically by the dotted line in FIGS. 2 and 3 for two conveyors 13 and 14. The chains are supported by guiding means which have not been represented but which are driven by cog-wheels 28, as can be seen in FIGS. 2 and 3.

According to the longitudinal direction of the chains, a succession of compartments or pigeon-holes 29 is provided, made out of L-shaped, folded plates, the fold being perpendicular on the longitudinal direction of the chains. One side of said plates is in upright position with respect to the chains, creating hence said catch means 25, while the other side 31 is fixed against the chains, forming the bottom part of the compartment 29.

Hereinafter, the operation of the above-mentioned apparatus for manufacturing innerspring constructions is described in more detail.

By means of a conveyor 13 a continuous string **2*a* (cf. FIG. 2) is sent between the cutting elements 15 and 16 of the cutting device 12 to another conveyor 14** mounted after the cutting device.

When a specific number of pocketed springs of said string have arrived on the second conveyor 14, the string is cut with the cutting elements 15 and 16, as in represented in FIG. 3. At that moment the conveyors 13 and 14 have stopped.

The next operation consists of sliding the string part **2*b* lying on the conveyor 14 via the fixed guiding support 23 and by means of an arm 32 to the conveyor 1 on which the application of adhesive occurs. This operation is clearly represented in FIG. 4, in which full lines indicate the arm 32 at rest, while dotted lines show the arm after it has been moved in the direction of arrow 33. When the arm 32** has finished its movement, it returns to its original position of rest. The movement back and forth of the arm preferably occurs pneumatically.

Next, the third conveyor 1 starts moving in the direction of the fixed applicator 5, as is indicated by arrow 34 in FIG. 1. As soon as the first jackets encasing springs of a string part (**2*b*) arrive underneath the applicator 5, the latter receives a signal; the gas necessary for the dispersion of the adhesive is then blown over the string in a continuous way, while the adhesive is squirted into the flux of gas, such that a homogeneous spray of adhesive is applied to the jackets encasing springs. Preferably, the gas starts blowing a short while before the supply of adhesive, and stops blowing after the last amount of adhesive has been sprayed in the flux of gas. According to the invention, this will enable to maintain the nozzle orifice 30 of the applicator 5** always completely clean. Moreover, from the beginning to the end of the operation spraying is constant and homogeneous.

When the entire string part **2*b* has gone past the applicator 5, it is slid by means of a second arm 35, which is very similar to the first arm 33; via a fixed guiding support 24 to the topple table 6** which is then in horizontal position.

Figure 5:
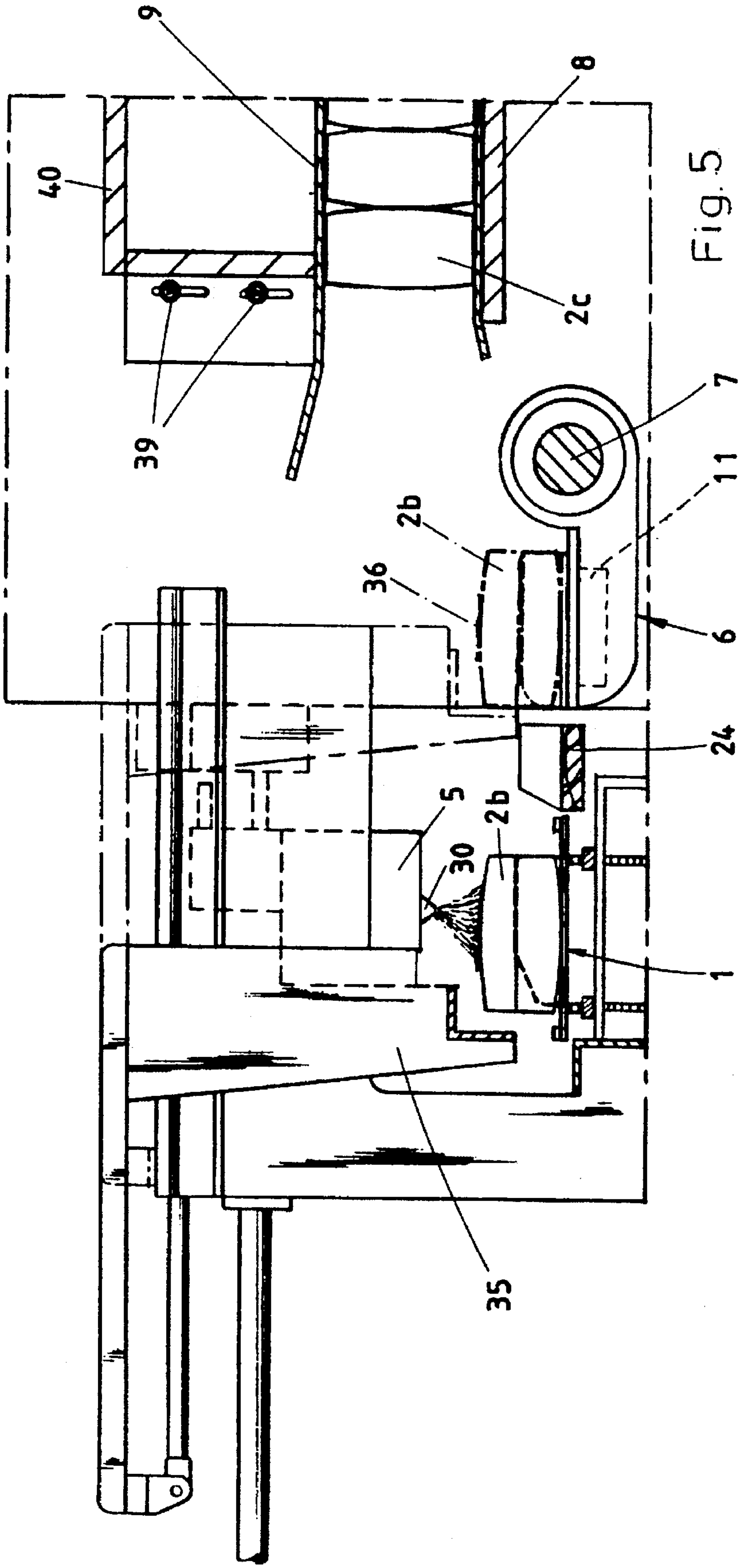
FIG. 5 shows part of a section along line V—V of FIG. 1, also on a larger scale. It relates to the application of bonding material.

The cycle of applying adhesive and passing on coated string parts **2*b* onto the topple table 6 is illustrated in FIG. 5**.

There, an arm 35, is represented in a position of rest in full lines, while a dotted line represents the arm in a projecting position, ready for operating.

The next operations now consist of getting the string part which is lying flat on the topple table 6 in vertical position and pushing it into contact with a string part treated in an earlier cycle. Said operations are illustrated in FIGS. 6 and 7.

FIG. 6 illustrates how the string part **2*b*, which has been coated with adhesive, after having left the conveyor 1 via the supporting surface 24, is slid onto the topple table 6 which is in horizontal position. The dotted line shows the next operation of the topple table 6 according to which the latter is turned round the axis 7** to a vertical position.

The dotted line in FIG. 7 shows the translation of the topple table in vertical position toward the assembly platform 8. The string part lying on the topple table is kept in place by means of electro-magnets 11 while the operation is going on. Then the string part is slid in the longitudinal opening 10 between the assembly platform 8 and the pressure plate 9, and pushed into contact with other string parts (*2c*, *2d*, etc.) which have been treated during earlier cycles.

It is possible to press a newly arrived string *2b* with sufficient force to strings which were on the assembly platform already during the translation of the topple table, because the pressure plate 9 slows down the shoving of adhered strings of pocketed springs. The pressure plate 9 and hence the distance between the platform 8 and the pressure plate 9 is adjustable by means of adjusting screws 39 which are fixed onto the pressure plate system 40.

It is also possible to put the springs of a particular string *2b* in a quincunx pattern with respect to an adjoining string *2c* which had already arrived on the assembly platform, the reason being that the topple table 6 can move in the direction of the rotation axis as well.

FIG. 8 shows in full lines schematically a top plan of two string parts *2b* and *2c* pushed into contact, as a result the topple table 6 turning on its rotation axis 7 and translating in a perpendicular fashion toward the assembly table. In such a case successive strings *2b*, *2c*, *2d* are each time pushed into contact in similar fashion, such that the axis of two pocketed springs are on a plane which is perpendicular on the longitudinal axis of the string parts.

The dotted line shows a string *2b* which is positioned against another string *2c* in a quincunx pattern. To this purpose the topple table 6 has moved axially, as shown by the dotted line in FIG. 8, before pushing the newly arrived string *2b* into contact with another string *2c*.

All these operations should preferably be programmed by means of a computer, such that the apparatus works continuously completely.

By means of synchronization, several operations can be carried out at the times e.g. when a coated string is pressed on the assembly platform, another string might be coated with adhesive and yet another might be prepared for this on conveyor 14. On this way, three operations are carried out nearly simultaneously. Hence it is possible to manufacture innerspring constructions with relatively great efficiency.

The invention is by no means limited to the abovementioned embodiment of the method and apparatus for manufacturing innerspring constructions for mattresses, cushions and the like. Within the scope of the invention several changes can be considered, e.g. concerning the application of adhesive to jackets encasing springs.

Hence the adhesive can be applied in successive dots or strips as, for instance, was described in the European Patent Application No. 154 076.

If the weld between two successive strings is large enough or if there are two welds between two adjacent jackets, the string 2 can be cut across the large weld or between the two successive welds, such that the border jackets remain closed after the cutting. However, if the weld is not large enough, it may be necessary to make new seals, during the cutting operation, next to the cut to close the sides of the border jackets. The necessary technique is known by itself.

The conveyor 14 shows a fixed number of compartments or pigeonholes in each of which one single pocketed spring of a cut string part *2b* is arranged, such that the length of these cut string parts is limited for a same apparatus.

If said length is shorter than the length allowed for, the conveyor will move, when the string part is cut, until the first pocketed spring arrives at the end of the conveyor 14.

Only then the next operation starts, as mentioned above.

What is claimed is:

1. A method for manufacturing an innerspring construction for mattresses comprising the steps of:

providing a plurality of strings of pocketed coil springs, said coil springs being spaced apart from each other and having longitudinal axes thereof being substantially parallel to each other and substantially perpendicular to a longitudinal direction of movement of said strings;

fixing the strings with adhesive side to side, including the steps of:

moving a first string having a particular number of pocketed springs in said longitudinal direction so that at least one side of the first string running parallel to the axis of the springs is coated with adhesive from a fixed spot;

moving the first string relative to a similar second string of pocketed springs so that a coated side of said first string is pushed into contact with a corresponding side of said second string; and repeating the cycle of operations on successive strings so that an innerspring construction of a desired size for a mattress is obtained.

2. A method as defined in claim 1, wherein the coated side of said first string of pocketed springs is in a substantially horizontal position facing upwards when the adhesive is applied and thereafter moved upright so that the coated side is disposed vertically; the coated side then being pushed into contact with a similar but uncoated side of said second string of pocketed springs; and repeating the cycle of operation until the innerspring construction of desired size is obtained.

3. A method as defined in claim 1, wherein said first string is cut from a continuous string of jackets encasing springs of a specific length, the side of said first string to be coated initially being in a horizontal position facing up and moved in a horizontal direction before it arrives at the fixed spot at which the adhesive coating is applied; said first string then being moved along said longitudinal direction while the side facing up is coated with said adhesive; said first string being subsequently moved in a horizontal direction substantially perpendicular to said at least one longitudinal side, tilted and pressed against said similar second string; and repeating the cycle of operation until an innerspring construction of a predetermined number of coated strings adhered side to side is obtained.

4. A method as defined in claim 3, wherein the pocketed springs of the first string and those of the second string are arranged in a quincunx pattern before one of the first and second string parts is pushed into contact with and adhered to the other, the first and second strings being subsequently translated such that the pocketed springs of said first string are positioned against demarcations between two successive jackets of said second string.

5. A method as defined in claim 1, wherein the adhesive is sprayed onto at least one side of each string of pocketed springs.

6. A method as defined in claim 1, wherein the adhesive is applied only to one of every two strings of pocketed springs that will be adhered to one another.

* * * * *